US010747711B2

(12) United States Patent
Telesca, Jr. et al.

(10) Patent No.: US 10,747,711 B2
(45) Date of Patent: Aug. 18, 2020

(54) DYNAMIC HYBRIDIZED POSITIONAL NOTATION INSTRUCTION SET COMPUTER ARCHITECTURE TO ENHANCE SECURITY

(71) Applicant: Arizona Board of Regents on Behalf of Northern Arizona University, Flagstaff, AZ (US)

(72) Inventors: Donald A. Telesca, Jr., Whitesboro, NY (US); Bertrand F Cambou, Flagstaff, AZ (US); Paul G Flikkema, Flagstaff, AZ (US)

(73) Assignees: ARIZONA BOARD OF REGENTS ON BEHALF OF NORTHERN ARIZONA UNIVERSITY, Flagstaff, AZ (US); GOVERNMENT OF THE UNITED STATES OF AMERICA, AS REPRESENTED BY THE SECRETARY OF THE AIRFORCE, Rome, NY (US)

( * ) Notice: Subject to any disclaimer, the term of this patent is extended or adjusted under 35 U.S.C. 154(b) by 0 days.

(21) Appl. No.: 16/358,509

(22) Filed: Mar. 19, 2019

(65) Prior Publication Data
US 2019/0294584 A1    Sep. 26, 2019

Related U.S. Application Data

(60) Provisional application No. 62/645,356, filed on Mar. 20, 2018.

(51) Int. Cl.
*G06F 9/48* (2006.01)
*H04L 9/30* (2006.01)
(Continued)

(52) U.S. Cl.
CPC ............ *G06F 15/7871* (2013.01); *G06F 8/41* (2013.01); *H04L 9/0618* (2013.01);
(Continued)

(58) Field of Classification Search
CPC .. G06F 21/52; G06F 21/6218; G06F 21/3203; G06F 21/57; G06F 21/6227;
(Continued)

(56) References Cited

U.S. PATENT DOCUMENTS 7,065,638 B1 *   6/2006   Chlytchkov .......... G06F 9/4411
                                                     713/1
7,626,521 B2 * 12/2009   Hussain ................. H04N 19/61
                                                     341/51

(Continued)

OTHER PUBLICATIONS

Djamel F. Hadj Sadok et al., On the performance of heterogeneous MANETs, Jul. 24, 2014, [Retrieved on Jan. 22, 2020]. Retrieved from the internet: <URL: https://link.springer.com/content/pdf/10.1007%2Fs11276-014-0777-z.pdf> 22 Pages (139-160) (Year: 2014).*

(Continued)

*Primary Examiner* — Anibal Rivera
(74) *Attorney, Agent, or Firm* — Quarles & Brady LLP

(57) ABSTRACT

Disclosed herein is a computing system with the capability to execute instructions in different positional notation values. The definition of a positional notation value is given by the general formula that represent a base 10 numeral in any positional notation in the following manner: . . . $d_3r^3+d_2r^2+d_1r^1+d_0r^0$, where d is a coefficient, r is the base of the positional number system (i.e. r=2 for binary, or r=3 for ternary), and the exponent is the position of the digit. The computing may provide a configuration which hybridizes the instructions of multiple positional notation values in variable ratios. The computing system may dynamically switch between the multiple hybridized instructions sets. Embodiments may be applied to provide security benefits.

16 Claims, 8 Drawing Sheets

(51) Int. Cl.
*G06F 9/44* (2018.01)
*G06F 17/50* (2006.01)
*G06F 15/78* (2006.01)
*H04L 9/06* (2006.01)
*G06F 8/41* (2018.01)
*H04L 9/08* (2006.01)
*G06F 9/4401* (2018.01)
*G06F 21/62* (2013.01)
*G06F 21/52* (2013.01)
*G06F 9/455* (2018.01)

(52) U.S. Cl.
CPC .......... *H04L 9/0643* (2013.01); *H04L 9/0822* (2013.01); *G06F 9/4411* (2013.01); *G06F 9/45545* (2013.01); *G06F 21/52* (2013.01); *G06F 21/6227* (2013.01); *H04L 9/3073* (2013.01)

(58) Field of Classification Search
CPC .. G06F 21/125; G06F 9/45545; G06F 9/4552; G06F 9/4411; G06F 9/4403; G06F 9/3017; G06F 9/44505; G06F 17/505; H04L 9/0618; H04L 9/3073; H04L 9/0822
See application file for complete search history.

(56) References Cited

U.S. PATENT DOCUMENTS

| | | | | |
|---|---|---|---|---|
| 8,566,601 B1* | 10/2013 | Waters | .................. | H04L 9/3073 380/30 |
| 8,607,299 B2* | 12/2013 | Baker | ................. | G06F 21/6218 726/1 |
| 9,164,735 B2* | 10/2015 | Hux | ......................... | G06F 8/24 |
| 9,495,183 B2* | 11/2016 | Bond | ................... | G06F 9/45545 |
| 9,524,153 B1* | 12/2016 | Guan | ........................ | G06F 8/41 |
| 9,692,592 B2* | 6/2017 | Kindarji | .............. | H04L 9/0618 |
| 10,102,015 B1* | 10/2018 | Gordon | ................. | G06F 9/4552 |
| 2005/0195975 A1* | 9/2005 | Kawakita | .............. | H04L 9/0822 380/30 |
| 2005/0289264 A1* | 12/2005 | Illowsky | ............... | G06F 1/3203 710/104 |
| 2008/0076547 A1* | 3/2008 | Bigelow | ................. | G06F 21/57 463/29 |
| 2008/0082772 A1* | 4/2008 | Savagaonkar | ........ | G06F 12/145 711/163 |
| 2008/0214300 A1* | 9/2008 | Williams | .............. | G06F 21/125 463/29 |
| 2013/0290692 A1* | 10/2013 | Guerrero | ............... | G06F 9/4403 713/1 |
| 2013/0290693 A1* | 10/2013 | Guerrero | ................ | G06F 30/30 713/1 |
| 2014/0304505 A1* | 10/2014 | Dawson | ............. | G06F 21/6227 713/165 |
| 2015/0178130 A1* | 6/2015 | Munjuluri | ............... | G06F 21/52 718/102 |
| 2015/0244527 A1* | 8/2015 | Clayton | ................... | G09C 1/00 713/189 |
| 2017/0315815 A1* | 11/2017 | Smith | .................... | G06F 9/3017 |
| 2018/0373514 A1* | 12/2018 | Gordon | ................. | G06F 8/4441 |
| 2019/0050514 A1* | 2/2019 | Ceppi | ..................... | G06F 30/33 |

OTHER PUBLICATIONS

Claudio Di Ciccio et al., Resolving inconsistencies and redundancies in declarative process, 2016, [Retrieved on Jan. 22, 2020]. Retrieved from the internet: <URL: https://pdf.sciencedirectassets.com/271528/1-s2.0-S0306437916X00087/1-s2.0-S0306437915302052/main.pdf> 22 Pages (425-446) (Year: 2016).*

* cited by examiner

DYNAMIC HYBRIDIZED POSITIONAL NOTATION INSTRUCTION SET COMPUTER ARCHITECTURE TO ENHANCE SECURITY

CROSS-REFERENCE TO RELATED APPLICATIONS

The present application claims priority to U.S. Provisional Application 62/645,356 entitled "Dynamic Hybridized Positional Notation Instruction Set Computer Architecture to Enhance Security" and filed on Mar. 20, 2018.

BACKGROUND OF THE INVENTION

Conventional computing devices include processing units and memory which are constructed using transistors. Since conventional transistors have well-defined "on" and "off" states, they are naturally suited to performing binary digital operations. Consequently, conventional computing architectures represent and store information in binary and perform computations using binary digital logic. For ease of use, modern computing systems provide programming interfaces allowing users to write programs in numerous programming languages which make use of statements and commands that resemble more common human language and/or mathematical notation. These programming interfaces provide compilers that convert programs written in high-level languages into binary machine code that can be executed by a processing unit such as a CPU.

Computing architectures using numeric bases other than binary have been proposed. For example, proposed trinary architectures represent data using three states (e.g., '−1', '0', and '1'). Though potentially more complex to implement, trinary architectures may be more efficient that conventional binary architectures. Similarly, memory devices capable of storing more than just binary values have been proposed and realized. For instance, multilevel FLASH memory may utilize three or more states enabling the storage of trinary value or values having higher bases. Other devices such as memristors have been proposed for use as multilevel memory cells and as building blocks for trinary digital logic. Although conventional binary computing systems and proposed trinary systems are different in some ways, they share fundamental similarities. For instance, both conventional binary computing systems and proposed trinary systems allow users to write programs in high-level languages which are translated by compilers into machine code that can be directly executed by a processing unit such as a CPU. Certain advanced conventional computing systems implement code morphing technology allowing the advanced computing system to receive a program intended for a different architecture and dynamically reinterpret or recompile the code into machine code suitable to be executed by the advanced computing system.

BRIEF SUMMARY

The present computing system provides dynamic architectures and therefore dynamic machine code instruction sets. Such improved architectures may provide several physical processing modules. Some modules may have an instruction set including only conventional binary operations, while other modules may implement trinary, quaternary, and other operations in bases beyond binary. The present architecture is further configured to dynamically change its architecture. As an example, a dynamic system might have a binary processing unit, a trinary processing unit, and a quaternary processing unit, each unit having a distinct instruction set. At one moment, such a dynamic system might process only binary machine codes while at another it might process only trinary machine codes, and so on. In some embodiments, such a system makes use of multiple processing units (and thus multiple machine code instruction sets) concurrently. Furthermore, the exact configuration of the system may be varied from moment to moment, as described herein.

In an embodiment a computing system comprises processing circuitry and a communications interface coupled to the processing circuitry. The processing circuitry comprises a set of computing units. The set of computing units includes at least a first computing unit implementing a first machine code instruction set and a second computing unit implementing a second machine code instruction set different from the first machine code instruction set. The first computing unit is configured to receive instructions belonging to the first machine code instruction set specified in a digital encoding using a first numerical base. The second computing unit is configured to receive instructions belonging to the second machine code instruction set specified in a digital encoding using a second numerical base.

The processing circuitry is configured to execute instructions for receiving, using the communications interface, a data stream encoding a set of computer instructions and configuration information. The configuration information specifies a configuration of the set of computing units to be used to execute the computer instructions. When the configuration information specifies a first configuration, the processing circuitry is configured to execute instructions for: causing the first computing unit to execute a first subset of the computer instructions; and causing the second computing unit to execute a second subset of the computer instructions.

In an embodiment a computing system comprises processing circuitry and a communications interface coupled to the processing circuitry. The processing circuitry is configured to execute instructions for: receiving, using the communications interface, configuration information; causing a multicompiler to compile a set of computer instructions into at least two subsets based on the configuration information, each compiled subset of the computer containing machine code instructions corresponding to a respective computing unit of the external computing system; and delivering the computer instructions, as the compiled subsets, to the external computing system using the communications interface.

The configuration information specifies a current configuration of an external computing system having multiple computing units. Each computing unit implements a corresponding machine code instruction set and configured to receive instructions belonging to the corresponding machine code instruction set specified in a digital encoding using a corresponding numerical base. Each compiled subset of the computer containing machine code instructions corresponds to a respective computing unit of the external computing system.

When the configuration information specifies a first configuration, the processing circuitry is configured to execute instructions for causing the multicompiler to: compile a first subset of the computer instructions specified by the first configuration into machine code of a first computing unit of the external computing system specified by the first configuration; and compile a second subset of the computer instructions specified by the first configuration into machine code of a first computing unit of the external computing system specified by the first configuration. Each corresponding machine code instruction set is different from each other corresponding machine code instruction set.

In an embodiment a method for operating a computing system comprises providing the computing system with a first computing unit within processing circuitry of the computing system implementing a first machine code instruction set and a second computing unit within the processing circuitry implementing a second machine code instruction set different from the first machine code instruction set. The first computing unit is configured to receive instructions belonging to the first machine code instruction set specified in a digital encoding using a first numerical base. The second computing unit is configured to receive instructions belonging to the second machine code instruction set specified in a digital encoding using a second numerical base.

The method further comprises receiving: a data stream encoding a set of computer instructions using a communications interface of the computing system and configuration information. The configuration information specifies a configuration of the set of computing units to be used to execute the computer instructions. The method further comprises processing the data stream by executing instructions. Executing the instructions causes the first computing unit to execute a first subset of the computer instructions according to the configuration information; and causes the second computing unit to execute a second subset of the computer instructions according to the configuration information.

Other embodiments of this aspect include corresponding computer systems, apparatus, and computer programs recorded on one or more computer storage devices, each configured to perform the actions of the methods.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

Figure 1:
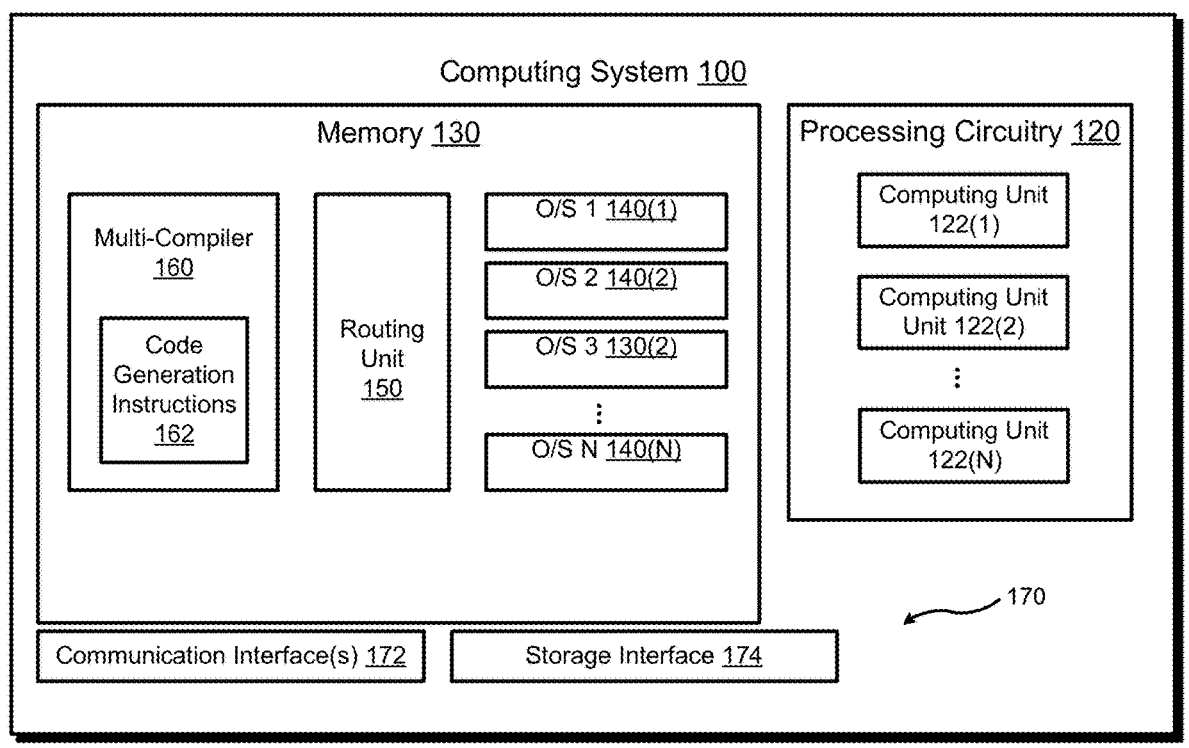
FIG. 1 is a block-level schematic of an example computing system in which embodiments of the present invention may be practiced.

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment.

This specification makes reference to various software constructs as modules "stored" and/or "instantiated" in memory. It should be understood that such constructs may be thought of both as instructions stored as data in a memory device but also as processes executing in processing circuitry in communication with that memory device. Thus, when processing circuitry executes the instructions associated with a particular software construct, the software construct is said to be instantiated within the memory, along with data structures created by during execution of the software construct. It should further be understood that, in some cases, multiple instances of the same software construct may be instantiated in one or more memory devices concurrently. "Memory" may refer to random-access memory, read-only memory, and/or registers within a processor or other similar structures.

Modern computers typically represent data as binary values. This is partly because using digital technology has certain advantages such as ease in perfectly copying data and regenerating noisy signals without degradation. Binary is the simplest form of digital computing and requires electronic components (such as diodes and transistors) whose operating states can easily represent two discrete states (e.g., 'off' and 'on' or '0' and '1'). Because the data are represented in binary when performing digital logic operations, it is common to store data as binary values and to encode operations executed by the processor(s) of a computer using binary values. However, digital data need not be stored in a binary format and digital computation need not rely solely on binary operations.

Numbers in various bases look different on the surface, but in actuality all numbering systems are mathematically equivalent. Consider the decimal notation of 19 for the following expression: $1 \times 10^1 = 9 \times 10^0$. The binary notation for 19 is 10011 which is understood to mean: $(1 \times 2^4) + (0 \times 2^3) + (0 \times 2^2) + (1 \times 2^1) + (1 \times 2^0) = 19$. The ternary notation for 19 is 201 which is understood as: $(2 \times 3^2) + (0 \times 3^1) + (1 \times 3^0) = 19$. The general formula to represent a base 10 numeral in any positional notation is defined as . . . $d_3 r^3 + d_2 r^2 + d_1 r^1 + d_0 r^0$ . . . wherein d is a coefficient, r is the base of the number system (e.g., r=2 for binary, r=3 for ternary), and the exponent is the position of the digit.

Computers based on binary architectures are simply a convention that is the result of general scientific inquiry and available technological breakthroughs between the 1700's and the 1930's. Known computer architectures beyond binary have been limited to ternary systems. The ternary system is one that uses positional notation with a base of three, operating with trinary digits ("trits") instead of bits. In terms of computing systems using transistors, base-3 has a genuine mathematical advantage over other numbering systems based on integers: as it is the most efficient of all integer bases and offers the most economical way of representing numbers. As an example, a single transistor can easily represent three states instead of the usual two, since a single transistor can conduct current in two directions when it is switched 'on'. Thus, one transistor (or similar device) can be used to represent three values (e.g., 'positive', 'zero', and 'negative', or 'greater than', 'equal, and 'less than'). In addition to conventional transistors, other devices can serve as building blocks for trinary computing devices.

As an example, existing multilevel NAND flash technologies are based on multiple threshold voltages to store ternary or quaternary bits. This technology is thereby able to store more information per chip, reducing the cost per stored gigabit. In conventional applications these chips include control circuitry that converts the ternary or quaternary information into binary information, making the flash devices appear as binary memories to the computing system.

Similarly, existing dynamic random-access memories (DRAM) have a design that is also naturally capable of ternary data storage. As Q electric charges are trapped in a cell to store a "1" state, there is no charge to store a "0" state, and Q/2 charges are stored for the reference cells. As the charges of the cells within the memory array slowly leak over time, the sensing element during "read" mode compares the remaining charges to the charge left in the reference cell. The design of a ternary DRAM device is based on trapping 0, Q/2, or Q charges on the arrays as well as Q/4 and 3Q/4 on the reference cells. Such a design has lower design margins and needs to be compensated by a more accurate sensing element.

The concept of ternary memristors and resistive random-access memories (ReRAMs) may also be used to increase the bit capacity of the memory arrays. One methods creates three different levels of resistivity during a programming cycle. This is done by adding more filaments between the electrodes of each cell or by enlarging the cross-section of the filaments. The three states are then defined by three resistances, typically in the 1-kΩ range for the "−1" state, 10 kΩ for the "0", and 10 MΩ for the "+1" state. In fact, a ten-state system has been demonstrated in hafnium oxide memristor devices.

Native ternary memories have been suggested with magnetic random-access memories (MRAM.) MRAM exploits giant magnetoresistance (GMR) in a stack of two antiferromagnetic layers with two tunnel oxides sandwiching a ferromagnetic layer and a self-reference design. The native ternary states have three different levels of resistivity. In addition, a ternary memory made from carbon nanotubes has been shown to be effective.

In binary logic, all operations can be composed of the most fundamental logic functions, which are "AND", "OR", and "NOT", where the corresponding functions. This property can be adapted to multi-valued logic (MVL) using fundamental logic functions called "MIN", "MAX", and "NOT". The fundamental binary logic gates can only be implemented in one manner, whereas MVL is capable of describing logic operations in a plurality of ways. A MIN function gives the minimum value of the input signal x. Where $x \in \{0, 1, 2, \ldots, r-1\}$, r is the radix of the signal. A MAX function gives the maximum value of the input signal x. It can be proven that the binary "AND" function can be generalized as a "MIN" function, and the binary "OR" can be generalized as a "MAX" function. The "NOT" function corresponds to the binary inverter. MVL logic introduces a vast array of new functions, but not all will necessarily be useful.

The paradigm of computing that relies on general purpose computing architectures is being revisited due to the increase of highly specialized computing problems. For example, neuromorphic computing is considered to be superior for optimizing classification schemes, but it does not bring the same advanced processing to all general-purpose computing needs. This diversity and complexity of computing problems is driving the need for heterogeneous hardware platforms that utilize multiple, highly specialized, innovative computer architectures. In this new paradigm disclosed herein, hardware advances should no longer be evaluated on their general-purpose advantages, but rather should be evaluated on their utility for addressing specific computing problems and interoperability in a diverse computing ecosystem.

Known technologies have made it practical to implement new highly-specialized computing architectures such as those disclosed herein while still maintaining interoperability with legacy applications and programming methods. For example, morphing operation codes have been used to modify the internal instruction set architecture (ISA) between generations while supporting the broad range of legacy x86 software available. A code morphing manager has been described to provide a method and system for converting software from a source version to a target version. In one embodiment, a plurality of code morphers may be associated based on the input version and the output version of each code morpher. A sequence of code morphers may be determined based on the source version and the target version, and then applied to the software.

Dynamic code generation is the creation of executable code at runtime. Such "on-the-fly" code generation is a powerful technique, enabling applications to use runtime information to improve performance by up to an order of magnitude. The unit of compilation for traditional just-in-time compilers can provide improvement in performance. A trace-based compilation, in which the unit of compilation is a loop, potentially spans multiple methods and even library codes.

Herein we disclose a computing system utilizing multiple digital representations of data enabled by technologies described above. The concept of a computing system consisting of several separate computing units, identified from 1 to N integer numbers, each computing unit capable of executing software codes written with the corresponding 1 to N positional notation instruction set, is a novel approach. Such computing systems will deliver increased information assurance from the plurality of operating configurations available. Similar to other abstracted coding languages above the machine language, high-level design of the operating system codes is accomplished at an abstract level. The developer is not required to have knowledge of the hardware requirements of each executing computing unit. A selecting scheme is used is to select the compiler or operating system (OS) for code compilation, and the routing unit sends the code to the appropriate compiler unit.

It should be understood that conventional computing systems such as those described above may have drawbacks addressed by embodiments disclosed herein. Because such conventional systems have a fixed architecture and a known instruction set, they are vulnerable to malicious code being deployed by intruders such as unauthorized users and hackers. For example, a common attack is a buffer overflow attack. An attacker exploits a bug in the operating system or in another program to insert data into a buffer data structure stored in memory of the computing system. If the attacker attempts to insert a large amount of data (i.e., larger than the intended size of the buffer), excess data may be stored in adjacent memory locations which store machine code instructions for the system to execute. If the attacker knows the system's architecture and the machine code instruction set for that system, the attacker can insert valid machine code into a memory location using this method, causing the system to execute unauthorized and malicious instructions.

In contrast to conventional approaches, embodiments disclosed herein are configured to dynamically change their architectures, incorporating computing units that (for example) perform operations in different numerical bases (e.g., binary, trinary, et al.). Because, in such embodiments, an outside attacker is not privy to the current state of the system, it may be impossible for the attacker to generate valid machine code executable by the system in its current state to cause the system to execute malicious instructions via an exploit.

FIG. 1 is a block-level schematic of a computing system 100 in which embodiments of the present invention may be practiced. The computing system 100 has processing circuitry 120, memory 130, and various interfaces 170 such as a communications interface 172, and a storage interface 174. Instantiated in the memory 130 are various processes which are executed by the processing circuitry 120. In particular, the memory 130 is shown storing and instantiating operating systems 140 (shown as operating systems 140(1) . . . 140(N)), a routing unit 150, and a multi-compiler 160. The multi-compiler 160 includes code generation instructions 162 for compiling code for the operating systems 140(1) . . . 140(N) which are executed using corresponding computing units 122(1) . . . 122(N).

It will be appreciated by one of ordinary skill in the art that while the routing unit 150 and multi-compiler 160 are depicted in FIG. 1 as software constructs instantiated in the memory 130 and executed by the processing circuitry 120, in other embodiments, the routing unit 150 and/or multi-compiler 160 may partially or completely comprise physical circuitry forming part of the processing circuitry 120.

Furthermore, it should be appreciated that in some embodiments, the computing system 100 interacts with an external computing device of a user. In such embodiments, the user device is optionally supplied with a routing unit 150 and multi-compiler 160, while in other embodiments, compiling of programs occurs within the computing system 100.

Figure 2:
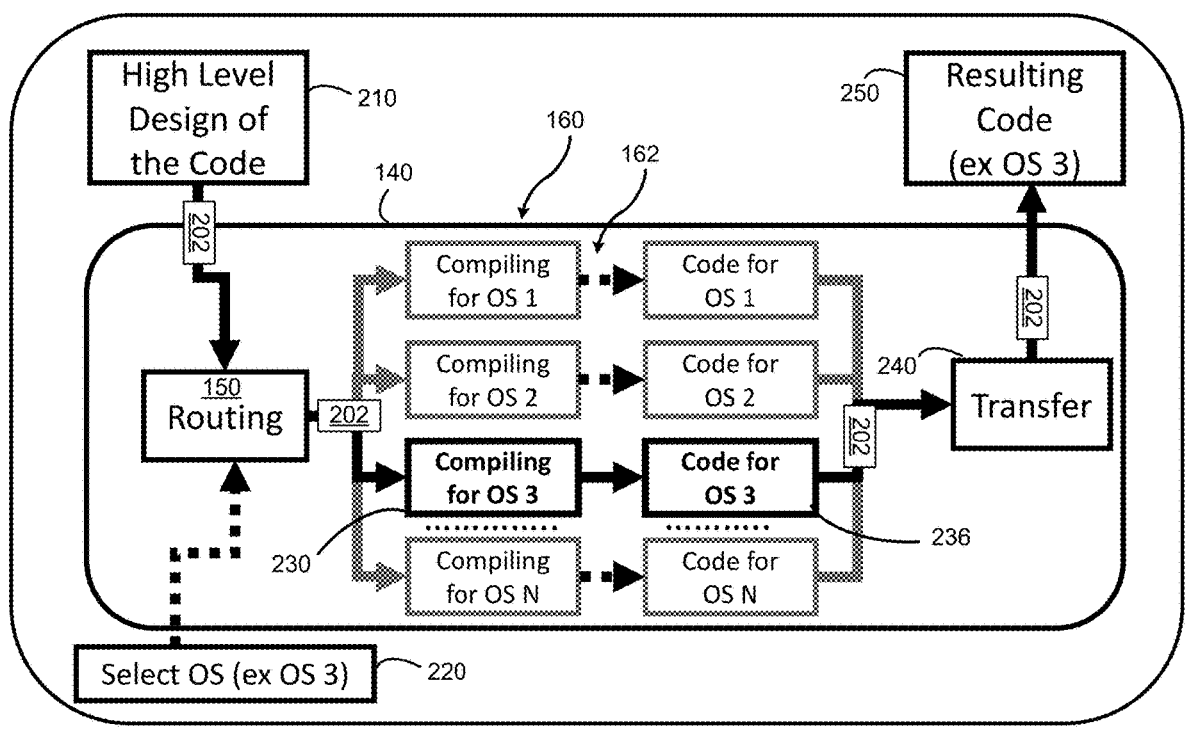
FIG. 2 is a block level schematic of a multi-compiler for a set of operating systems (OS) 1 to N, according to one embodiment.

FIG. 2 is a block-level schematic depicting the input of a high-level design code 210 into an exemplary multi-compiler, such as multi-compiler 160 of FIG. 1. The routing unit 150 receives high-level code 210, such as, for example, code written in a high-level human-readable language such as C, Python, Java, et al., and a message 220 indicating a particular target operating system, such as OS 140(3) in this example. The multi-compiler executes the appropriate compilation instructions belonging to the code-generation instructions 162, to generate the code 236 appropriate to OS 140(3). The path 202 illustrates the transition from the higher abstraction level, into the routing unit 150, to the appropriate compiling operation 162 for OS 140(3), through a transfer operation 240, producing the resulting output code 250.

Figure 3:
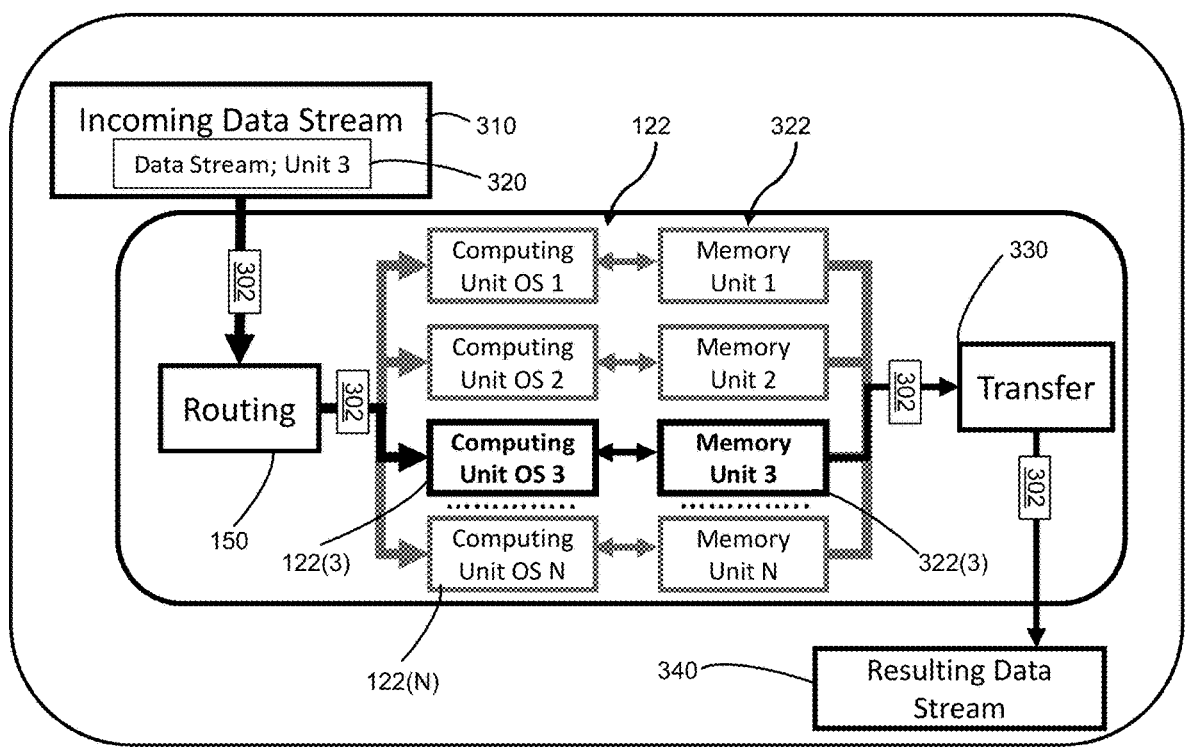
FIG. 3 shows an analysis of a data stream aimed at a particular computing unit 1 to N, according to one embodiment.

The multi-compiler architecture shown in FIG. 2 is used in a computing system (such as computing system 100 of FIG. 1) that can select and execute operating system instruction sets 1 to N (depicted as operating systems 140(1) . . . 140(N) as depicted in FIG. 1) based on positional notation systems 1 to N. FIG. 3 shows how the routing unit 150 is used to direct an incoming data stream 310 via path 302 to the necessary computing unit 122, such as computing unit 122(3), for example; the data stream 310 will only run on computing unit 122(3) which utilizes OS 140(3) and has a bi-directional communication link with an appropriate memory unit 322, such as memory unit 322(3). In the embodiment pictured each memory unit 322 forms a portion of memory 130. Memory units 322 may be optimized for a particular OS 140 and its corresponding instruction set. For instance, OS 140(3) may use a trinary instruction set and memory 322(3) may physically comprise inherently trinary memory devices. In this manner, the corresponding computing unit 122 processes data streams with the required OS 140 and an appropriate resulting data stream 340 is generated from the input data stream 310. As shown, the incoming data stream 310 includes information 320 identifying the appropriate computing unit 122 (computing unit 122(3) as depicted by FIG. 3, for example).

The computing system 100 is capable of inputting a data streams comprised of several portions or segments or that require different computing units 122. The routing unit 150 directs each data stream to the required computing unit 122(1) . . . 122(N). Each computing unit 122 then processes the corresponding data stream for any of OS 140(1) to 140(N). The data streams generated from the multiple operating systems 140 are then combined to form a resulting final data stream.

Figure 4:
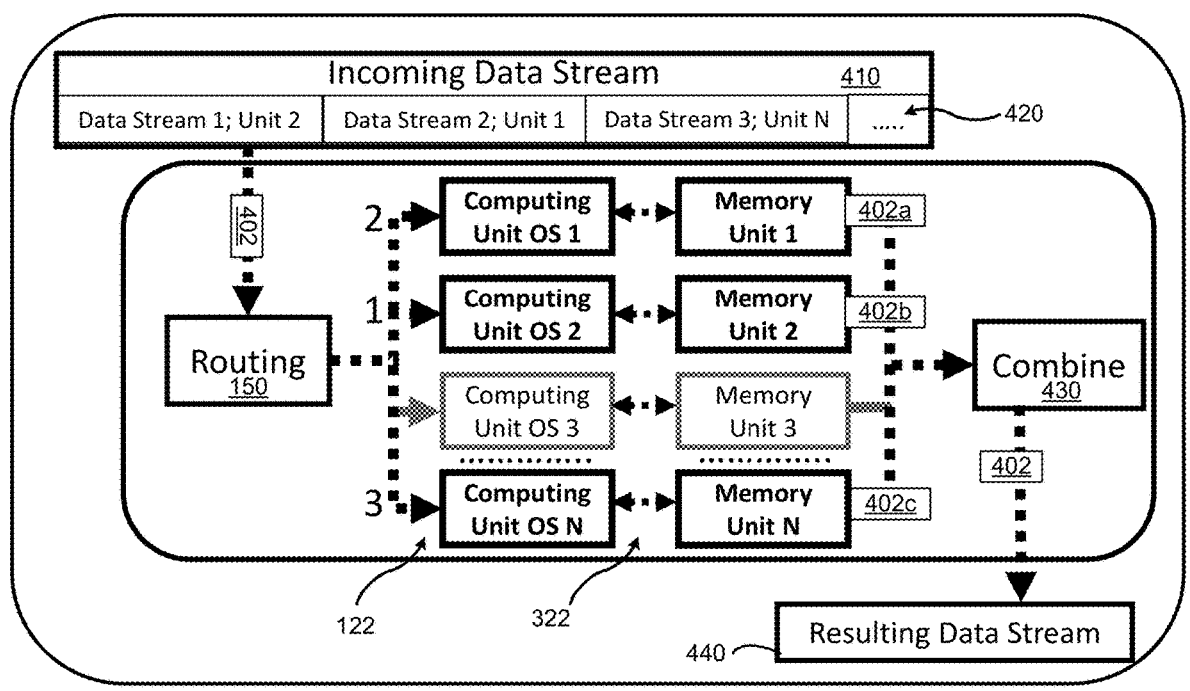
FIG. 4 depicts an analysis of a data stream comprised of several segments aimed at computing units 1 to N, according to one embodiment.

As shown in FIG. 4, the routing unit 150 directs a data stream 410 comprised of portions 420 containing code for computing units 122(1) . . . 122(N) via path 402. In this example the computing units 122(1), 122(2) and 122(N) each process one of the portions 420 of data stream 410 that are respectively associated with various operating systems 140 such as OS 140(1), OS 140(2), and OS 140(N) and their associated computing units 122 (i.e., 122(1), 122(2), and 122(N) of FIG. 1). Individual data streams generated for OS 140(1), OS 140(2), and OS 140(N) are processed (as illustrated by braches 402a, 402b, and 402c) and combined (see the 'combine' process 430) to form the resulting data stream 440. In an example embodiment, each portion 420 includes information identifying the computing unit 122 it is intended for. In other embodiments, the routing information may be included in an encrypted message from an external system, or agreed upon with an external system using methods described below.

In the embodiments described above, elements of the computing system 100 are capable of operating exclusively in any OS 140, i.e., any of OS 140(1) . . . 140(N) or analyzing data streams suitable for computing units 122(1) . . . 122(N). In addition, the computing system 100 is capable of operating in a hybridized manner, as indicated by FIG. 4, for example. The degree of hybridization can be set to variable ratios. As such, $P_n$ is defined as a variable representing either the available compiling units described in FIG. 2 or the different data streams described in FIG. 4. In one embodiment, the configuration includes 20% $P_1$, 40% $P_2$ and 40% $P_n$. External systems which may transmit data streams for execution by the computing units 122 receive or are supplied with information specifying the set of allowed configurations. This configuration information may include information about the architecture of the individual computing units 122 and/or the corresponding operating systems 140. A generalized equation describing the configuration state, referred to as $C_n$, is given below as Equation 1, wherein n is constrained by the largest available positional notation for use, $P_r$ maps to a positional notation (e.g., binary, ternary, quaternary), and $\alpha_r$ is a chosen coefficient to control the distribution of hybridization across the used positional notations within the constraints of the equation.

$$C_n = \Sigma_{r=1}^{n}(\alpha_r P_r, 0 \leq \alpha_r \leq 1) \text{ and } \Sigma(\alpha_r = 1) \quad \text{(Equation 1)}$$

The system described in FIG. 4 may also be used to implement a plurality of instruction sets within a single positional notation. For example, the system can be configured to use a ternary positional notation with different computing units set to use different ternary instruction sets. As one specific example, the system could have 9 different ternary units with 9 different instruction sets.

For dynamical hybridization, the routing unit 150 can additionally be capable of temporal control of the distribution of configuration hybridization, allowing dynamic switching of the configuration hybridization. The temporal component is integrated into the configuration state model in Equation 1 through the $\alpha_r$ coefficients; Equation 1 is then modified to form Equation 2 below.

$$C(t)_n = \Sigma_{r=1}^{n}(\alpha(t)_r P_r, 0 \leq \alpha(t)_r \leq 1) \text{ and } \Sigma(\alpha(t)_r = 1) \quad \text{(Equation 2)}$$

This embodiment has an initial configuration at time $t_0$ comprising 20% $P_1$ instructions, 40% $P_2$ instructions, and 40% $P_n$ instructions. The routing unit 150 can be set for any recurrent time scale $\Delta t$ to then switch to a hybridization of 30% $P_1$ instructions, 20% $P_2$ instructions, and 50% $P_n$ instructions at a time $t=t_n+\Delta t$. At time $t=t_0+2\Delta t$, the configuration can be switched to a third hybridization, and so on.

The present invention may be applied to advanced multi-state electronics including microelectronics. The different positional notations are supported by the requisite hardware that is integrated into the full computing platform. For example, in order to execute and store ternary logic, three-state electronics must be used. Dedicated custom-state microelectronics can be used for each positional notation (e.g., three-state electronics for ternary, four-state electronics for quaternary, etc.) as shown in FIGS. 2 and 3.

Figure 5A:
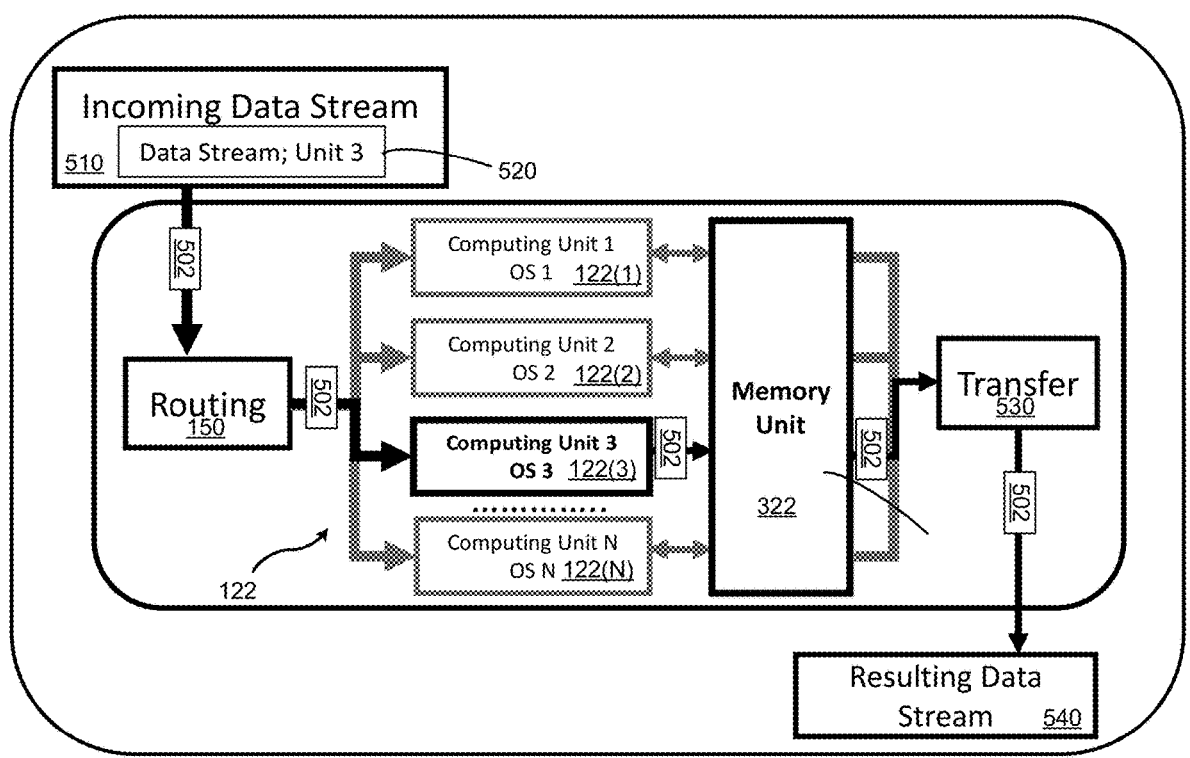
FIG. 5A depicts an analysis of a data stream aimed at a particular computing unit 1 to N with a single number system, according to one embodiment.

An additional implementation of this computing systems employs advanced multi-state microelectronics capable of supporting positional notations less than or equal to the available maximum number of states restricted by the hardware. For example, if there was a reliable ten-state memory unit, all positional notations up to ten could use the same memory unit. As illustrated in FIG. 5A, if OS 140(3) is a ternary positional notation system, then OS 140(3) only uses three of the available ten states in the shared ten-state memory unit; similarly, a quaternary system would only use four of the available ten states.

Figure 5B:
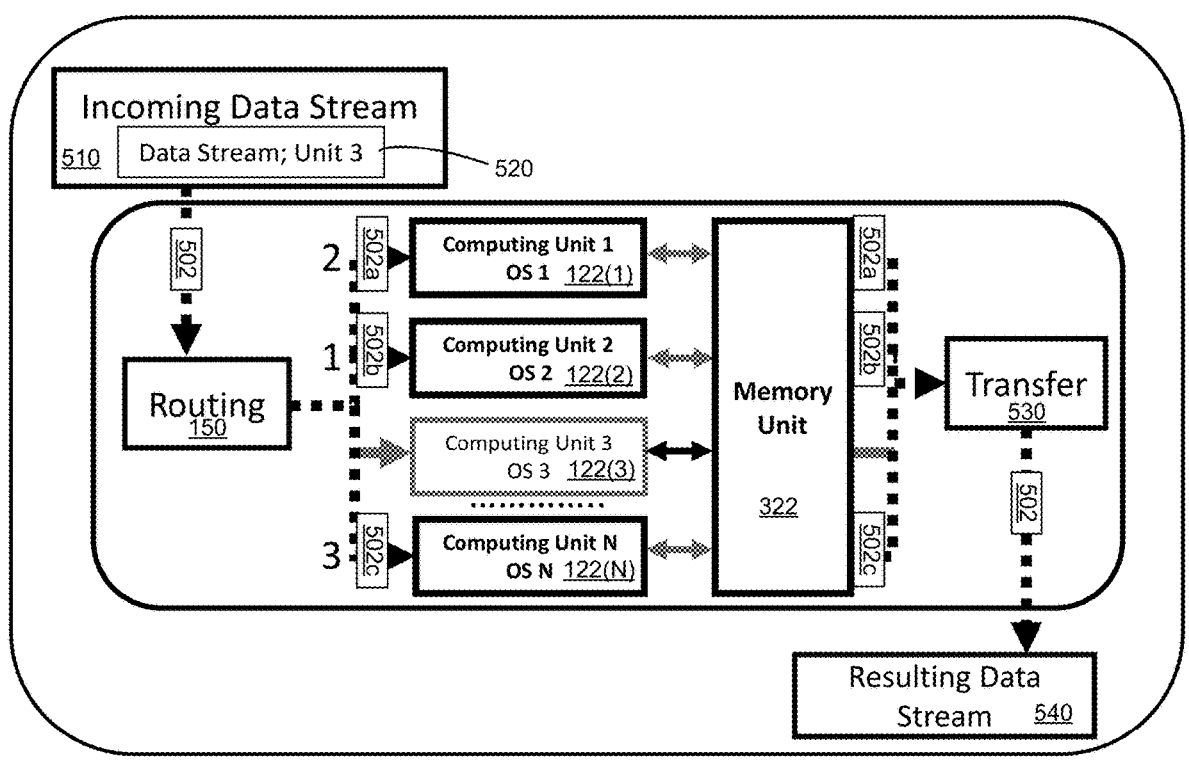
FIG. 5B depicts an analysis of a data stream comprised of several segments aimed at computing units 1 to N with a single number system, according to one embodiment.

In the embodiment shown in FIG. 5A, the routing unit directs the incoming data stream to its computing unit 122(3) via path 502. The computing unit processes the data stream 520 with OS 140(3), sharing the data stream 520 with the memory 322 (a single unit in this example) and generating the resulting data stream 540. Similar to FIG. 3, the computing system 100 is also capable of inputting data streams comprised of several segments that require different computing units 122. The routing unit 150 directs each data stream to the required computing unit 122(1) . . . 122(N). Each computing unit 122 then processes the corresponding data stream for that OS 140(1) . . . 140(N) using the memory unit 322, shown here as a shared single-state memory. The data streams generated from the multiple operating systems 140 are then combined to form the resulting final data stream 540. One embodiment is shown in FIG. 5B, wherein the routing unit 150 directs different sections of the incoming data stream 520 to the respective computing units 122(1), 122(2), and 122(N)). FIG. 5B shows the same components as FIG. 5A. FIG. 5B adds labels 1, 2, 3 indicating routing of three segments of the incoming data stream 510 via branches 502a, 502b, and 502c.

Each computing unit 122 processes the corresponding data streams with the correct OS, e.g., 140(1), 140(2), and 140(N), utilizing memory unit 322, depicted here as a shared multi-state memory resource. The individual data streams generated for OS 140(1), OS 140(2), and OS 140(N) are combined to form the resulting data stream 540.

The novel systems and methods described herein may be applied to security protocols. The fundamental value of this computing architecture is to enhance security between parties communicating through a non-secure channel. Assuming that a code, or portion of a code, is written with high level software tools, as described in connection with FIG. 2, it can be compiled to be executed by the computing units 122(1) . . . 122(N). Cryptography can be used to transfer the information between the communicating parties based on what particular computing unit 122(1) to 122(N) is needed to execute the transmitted code. As described in connection with FIG. 4, and FIG. 5B, several portions of the code can be written to be executed by different computing units 122. The number of possible combinations is very high. For example, with a system with ten different units, there are ten million ways to process a code in ten different segments. A malicious third party will have difficulty to attack the system without knowing which computing unit 122 is needed to execute the corresponding portion of the code.

Figure 6:
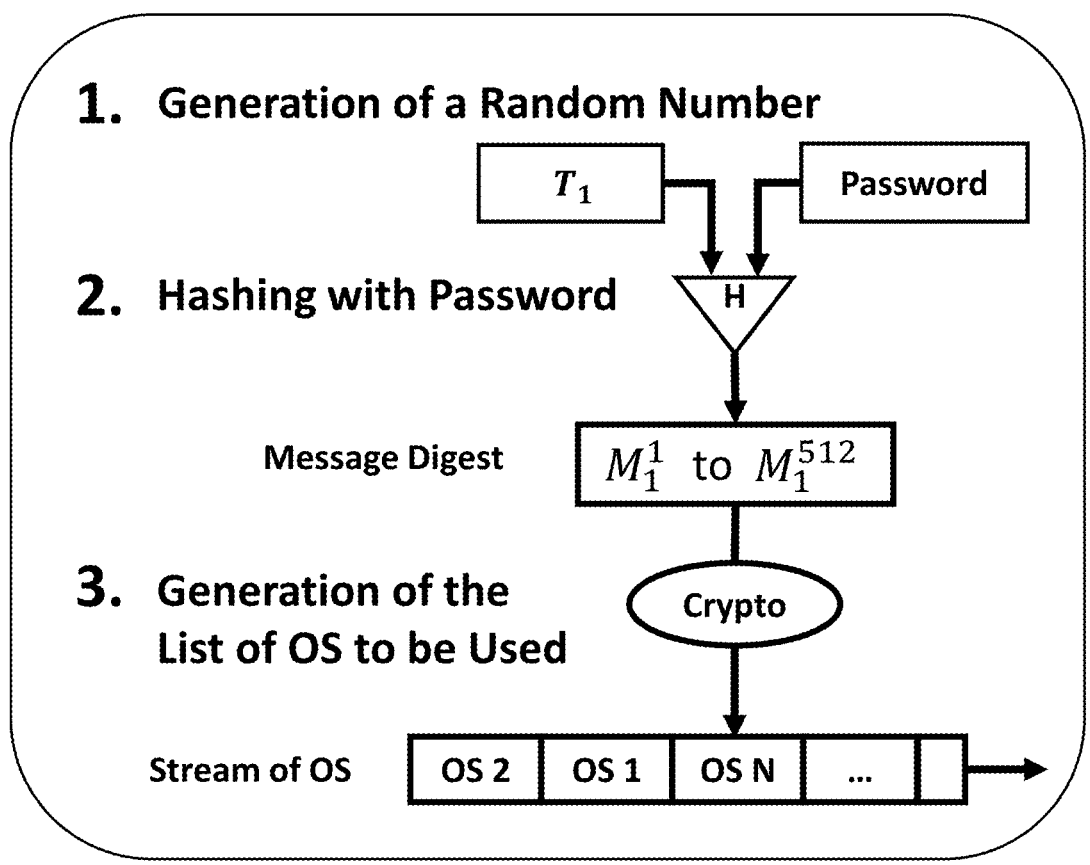
FIG. 6 is an example of a generation of a stream of Operating Systems (OS) with a Random Number and multi-factor authentication, according to one embodiment.

One embodiment of secure generation of a dynamic sequence of positions is presented in FIG. 6. A random number $T_1$ combined with a password generates a message digest through a hash function. A suitable cryptographic scheme transforms the message digest into a dynamic sequence of positions to be used to segment the code into a particular sequence (e.g., OS 140(2)/OS 140(1)/OS 140(N) as shown) in this embodiment.

Figure 7:
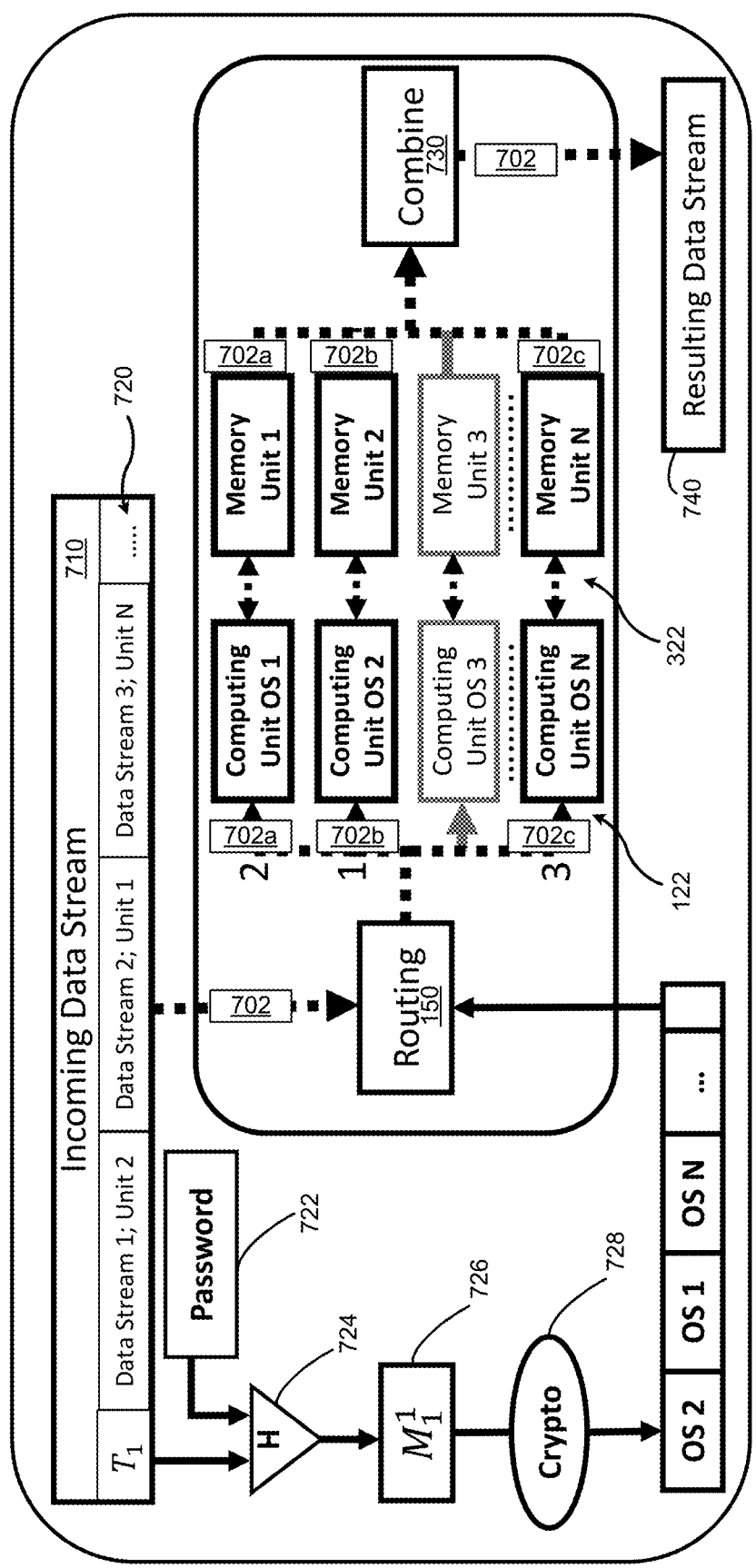
FIG. 7 shows an analysis of a data stream comprised of several segments with multi-factor authentication, according to one embodiment.

At the receiving end, as shown in FIG. 7, the same random number $T_1$ (shown as part of the incoming data stream 710), the same password (shown as 722), the same hash function (shown as 724), and message digest (shown as 726) can generate the same dynamic sequence of positions using the same cryptographic scheme (shown as 728) in order to route the incoming data stream 710 as illustrated by path 702. The originating party may transmit the random number to the receiving party as part of the data stream, as shown. Alternatively, the parties may have synchronized random number generators or otherwise share the random number between them. The portions 720 of the data stream 710 (also labeled "Data Stream 1", "Data Stream 2", and "Data Stream 3") are directed as illustrated by branches 702a, 702b, and 702c and the outputs combined (see combine operation 730) to produce the resulting data stream 740. A third party without the password 726 cannot generate the same dynamic sequence if they possess only the random number $T_1$. The list of operating systems 140 to be used during the exchange, OS 140(2)/OS 140(3)/OS 140(N), is thereby independently generated by the communicating parties. The random number can be changed as often as necessary to provide the desired level of security.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A computing system comprising:
    processing circuitry, the processing circuitry comprising a set of computing units, the set of computing units including at least:
        a first computing unit implementing a first machine code instruction set and configured to receive instructions belonging to the first machine code instruction set specified in a digital encoding using a first positional encoding having a first numerical base; and
        a second computing unit implementing a second machine code instruction set different from the first machine code instruction set and configured to receive instructions belonging to the second machine code instruction set specified in a digital encoding using a second positional encoding having a second numerical base different from the first numerical base; and
    a communications interface coupled to the processing circuitry;
    wherein the processing circuitry is configured to execute instructions for:
        receiving, using the communications interface, a data stream encoding a set of computer instructions and configuration information, the configuration information specifying a configuration of the set of computing units to be used to execute the computer instructions; and
        when the configuration information specifies a first configuration, the processing circuitry is configured to execute instructions for:
            causing the first computing unit to execute a first subset of the computer instructions; and
            causing the second computing unit to execute a second subset of the computer instructions.

2. The computing system of claim 1, wherein, when the configuration information specifies a second configuration, the processing circuitry is configured to execute instructions for:
    causing the first computing unit to execute a third subset of the computer instructions; and
    causing the second computing unit to execute a fourth subset of the computer instructions;
    wherein the first and second subsets of the computer instructions jointly form an entirety of the computer instructions; and
    wherein the third and fourth subsets of the computer instructions jointly form an entirety of the computer instructions.

3. The computing system of claim 2, wherein the processing circuitry further comprises a configuration generation module, the configuration generation module configured to periodically select, as the configuration information, a current configuration from a set of candidate configurations and the processing circuitry is further configured to process the configuration information in response to each periodic selection of the current configuration.

4. The computing system of claim 3, wherein the processing circuitry is further configured, as part of processing the configuration information, to transmit compilation instructions to an external computing device via the communications interface, the compilation instructions enabling a compiler of the external computing device to generate:
    object code for the first computing unit from a first portion of the computing instructions; and
    object code for the second computing unit from a second portion of the computing instructions.

5. The computing system of claim 2, wherein the set of computer instructions encoded by the data stream is rendered into subsets of the computer instructions and wherein receiving, using the communications interface, the data stream includes:
    receiving, as the configuration information, a random number;
    applying a hashing function to the random number and a password to generate a message digest; and
    generating routing instructions by applying a cryptographic function to the message digest, the routing instructions specifying, for each subset of the computer instructions a corresponding computing unit to be used to execute that subset of the computer instructions.

6. The computing system of claim 1, wherein the processing circuitry is further configured to receive the configuration information via the communications interface from an external computing device.

7. The computing system of claim 1, wherein the set of computing units includes at least one computing unit implementing a machine code instruction set in a base greater than binary, the at least one computing unit configured to receive instructions belonging to the first machine code instruction set specified in a digital encoding using a numerical base of at least three.

8. A method for operating a computing system, the method comprising:
    providing the computing system with:
        a first computing unit within processing circuitry of the computing system implementing a first machine code instruction set and configured to receive instructions belonging to the first machine code instruction set specified in a digital encoding using a first positional notation having a first numerical base; and
        a second computing unit within the processing circuitry implementing a second machine code instruction set different from the first machine code instruction set and configured to receive instructions belonging to the second machine code instruction set specified in a digital encoding using a second positional notation having a second numerical base different from the first numerical base;
    receiving:
        a data stream encoding a set of computer instructions using a communications interface of the computing system; and configuration information, the configuration information specifying a configuration of the set of computing units to be used to execute the computer instructions; and processing the data stream by executing instructions:
  causing the first computing unit to execute a first subset of the computer instructions according to the configuration information; and
  causing the second computing unit to execute a second subset of the computer instructions according to the configuration information.

9. The method of claim 8, wherein receiving the configuration information includes:
  receiving a message from an external computing device using the communications interface, the message being different from the configuration information;
  reproducing the configuration by combining the message with a password shared by the computing system and the external computing device.

10. The method of claim 9, wherein the message is a random number and wherein combining the message with the password includes applying a preselected hashing function to a concatenation of the message with the password.

11. The method of claim 8, the method further comprising:
  transmitting the configuration information to a user device via the communications interface, the configuration information enabling a multicompiler of the user to generate:
    the first subset of computer instructions comprising object code conforming to the first machine code instruction set; and
    the second subset of computer instructions as object code conforming to the second machine code instruction set.

12. The method of claim 11, wherein the configuration information is transmitted as a random number which, when combined with a password of the computing device and hashed by a preselected hashing function, reproduces the configuration information.

13. A computing system comprising:
  processing circuitry; and
  a communications interface coupled to the processing circuitry;
  wherein the processing circuitry is configured to execute instructions for:
    receiving, using the communications interface, configuration information specifying a current configuration of an external computing system having multiple computing units, each computing unit implementing a corresponding machine code instruction set and configured to receive instructions belonging to the corresponding machine code instruction set specified in a digital encoding using a corresponding numerical base;
    causing a multicompiler to compile a set of computer instructions into at least two subsets based on the configuration information, each compiled subset of the computer containing machine code instructions corresponding to a respective computing unit of the external computing system; and
    delivering the computer instructions, as the compiled subsets, to the external computing system using the communications interface;
  wherein, when the configuration information specifies a first configuration, the processing circuitry is configured to execute instructions for causing the multicompiler to:
    compile a first subset of the computer instructions specified by the first configuration into machine code of a first computing unit of the external computing system specified by the first configuration; and
    compile a second subset of the computer instructions specified by the first configuration into machine code of a first computing unit of the external computing system specified by the first configuration;
  wherein each corresponding machine code instruction set is different from each other corresponding machine code instruction set; and
  wherein each corresponding machine code instruction set is specified in a digital encoding using a respective positional notation having a respective numerical base, the respective numerical base for each corresponding machine code instruction set being different from the respective numerical base of each other corresponding machine code instruction set.

14. The computing system of claim 13:
  wherein at least one the compiled subsets of the computer instructions contains machine code instructions in a ternary or higher base, the machine code instructions in the ternary or higher based being specified in a digital encoding using a numerical base of at least three.

15. The computing system of claim 14, wherein receiving the configuration information includes:
  receiving a message different from the configuration information;
  reproducing the configuration by combining the message with a password shared by the computing system and the external computing system.

16. The computing system of claim 15, wherein the configuration information is received from a third-party computing device distinct from the computing system and the external computing system.

* * * * *